US012275023B2

(12) United States Patent
Lord et al.

(10) Patent No.: US 12,275,023 B2
(45) **Date of Patent: *Apr. 15, 2025**

(54) EFFICIENT SHOWERHEAD WITH PURGE OUTLET

(71) Applicant: AM CONSERVATION GROUP, Charleston, SC (US)

(72) Inventors: Charles Lord, Scottsdale, AZ (US); Jason Swanson, Tempe, AZ (US); Troy Sherman, Gilbert, AZ (US); Jeffrey Doss, Scottsdale, AZ (US)

(73) Assignee: AM CONSERVATION GROUP, Charleston, SC (US)

(*) Notice: Subject to any disclaimer, the term of this patent is extended or adjusted under 35 U.S.C. 154(b) by 9 days.

This patent is subject to a terminal disclaimer.

(21) Appl. No.: 18/521,871

(22) Filed: Nov. 28, 2023

(65) Prior Publication Data

US 2024/0091796 A1 Mar. 21, 2024

Related U.S. Application Data

(63) Continuation of application No. 17/222,990, filed on Apr. 5, 2021, now Pat. No. 11,833,529, which is a (Continued)

(51) Int. Cl.

| | |
|---|---|
| ***B05B 1/18*** | (2006.01) |
| ***E03B 1/04*** | (2006.01) |
| ***E03C 1/04*** | (2006.01) |

(52) U.S. Cl.

CPC ................ *B05B 1/18* (2013.01); *E03B 1/048* (2013.01); *E03C 1/0404* (2013.01); *E03C 1/0408* (2013.01); *E03C 2201/30* (2013.01)

(58) Field of Classification Search

CPC ......... B05B 1/18; B05B 12/087; B05B 15/00; E03B 1/048; E03C 1/0408; E03C 1/0404; E03C 2201/30; F16K 31/002; F16K 31/60

See application file for complete search history.

(56) References Cited

U.S. PATENT DOCUMENTS

| | | | |
|---|---|---|---|
| 1,791,811 | A | 2/1931 | Giesler |
| 1,814,512 | A | 7/1931 | Hetherington |

(Continued)

FOREIGN PATENT DOCUMENTS

| | | |
|---|---|---|
| CN | 200965079 | 10/2007 |
| CN | 103234064 | 8/2013 |

(Continued)

*Primary Examiner* — Kun Kai Ma

(74) *Attorney, Agent, or Firm* — Booth Udall Fuller, PLC; Kenneth C. Booth

(57) ABSTRACT

A showerhead system with a normally open, temperature controlled first water valve coupled between a hot water source supply inlet and a purge outlet. The first water valve is configured to move from its normally open position to a closed position to restrict water passing from the hot water source supply inlet to the purge outlet when the temperature controlled water valve reaches a predetermined temperature. In a first mode, the first water valve purges water from the hot water source supply inlet through the purge outlet until the thermal actuator reaches the predetermined temperature. In a second mode, the first water valve blocks water entering the first water valve from passing through the purge outlet toward the showerhead outlet. In an optional third mode, a normally closed, manual second water valve is open and passes water through the showerhead outlet.

20 Claims, 8 Drawing Sheets

Related U.S. Application Data continuation of application No. 16/201,179, filed on Nov. 27, 2018, now Pat. No. 10,967,390.

(60) Provisional application No. 62/593,744, filed on Dec. 1, 2017.

(56) References Cited

U.S. PATENT DOCUMENTS 2,556,777 A 6/1951 Reimuller
3,038,664 A 6/1962 Kingsley
3,263,926 A 8/1966 Couffer
3,368,758 A * 2/1968 Fraser .................... E03C 1/041 236/93 B
3,420,293 A 1/1969 Campbell
3,742,521 A 7/1973 Bolgert
3,935,998 A 2/1976 Caldwell
4,281,790 A 8/1981 McGinnis
4,298,568 A 11/1981 Gerhardt
4,336,903 A 6/1982 Zirps
4,431,020 A 2/1984 Kowalski
4,460,007 A 7/1984 Pirkle
4,523,604 A 6/1985 Hutto
4,638,828 A 1/1987 Barrineau, Sr.
4,651,768 A 3/1987 Epe
4,834,873 A 5/1989 Burrows
4,878,512 A 11/1989 Pirkel
5,062,164 A 11/1991 Lee
5,271,559 A 12/1993 Naujock
5,368,227 A 11/1994 McGinnis
5,390,899 A 2/1995 Sergio
5,408,709 A 4/1995 Lockwood
5,560,541 A 10/1996 Warshawsky
5,584,432 A 12/1996 Lockhart
5,586,722 A * 12/1996 Murray .................. G05D 23/08 236/93 B
5,595,216 A 1/1997 Pilolla
5,826,613 A 10/1998 Schalk
5,826,790 A 10/1998 Raether
5,915,665 A 6/1999 Paese
6,042,015 A 3/2000 Eveleigh
6,125,872 A 10/2000 Cunkelman
6,230,734 B1 5/2001 Grebnev
6,237,853 B1 5/2001 Bergmann
6,325,092 B1 12/2001 Pirkle
6,616,058 B1 9/2003 Pirkle
6,899,132 B2 5/2005 Mikiya
7,380,731 B1 6/2008 Hsu
7,434,780 B2 10/2008 Hayashi
7,681,804 B2 * 3/2010 Lockhart ............... F16K 31/002 236/93 B
7,814,585 B1 10/2010 Reich
7,878,417 B2 2/2011 Brown
8,434,693 B2 5/2013 Brown
9,200,724 B2 12/2015 Ye
9,309,655 B2 4/2016 Brown
9,611,629 B2 4/2017 Brown
9,737,899 B2 8/2017 Doss
10,066,376 B2 9/2018 Doss
2002/0062867 A1 5/2002 Kempf
2002/0069655 A1 6/2002 Lee
2005/0004712 A1 1/2005 Stevens
2005/0258258 A1 11/2005 Jonte
2006/0157575 A1 7/2006 Lockhart
2007/0075152 A1 4/2007 Guterman
2007/0119989 A1 5/2007 Nagano
2008/0128028 A1 6/2008 Weltman
2009/0293961 A1 12/2009 McMurtry
2009/0308459 A1 12/2009 Gross
2010/0301252 A1 12/2010 Myran
2011/0180741 A1 7/2011 Lockhart
2015/0360243 A1 12/2015 Soetaert
2016/0201305 A1 7/2016 Doss
2016/0326729 A1 11/2016 Jones
2017/0072412 A1 3/2017 Hawkins

FOREIGN PATENT DOCUMENTS

CN 204620247 9/2015
CN 204911859 12/2015
CN 105722443 6/2016
CN 105757292 7/2016
CN 205587177 9/2016
CN 106015653 10/2016
GB 2303685 2/1997
JP 2006283274 10/2006
WO 9111643 8/1991
WO 2015054528 4/2015

* cited by examiner

EFFICIENT SHOWERHEAD WITH PURGE OUTLET

RELATED APPLICATIONS

This application is a continuation of U.S. utility patent application Ser. No. 17/222,990, filed Apr. 5, 2021 titled "EFFICIENT SHOWERHEAD WITH PURGE OUTLET," which application is a continuation of U.S. utility patent application Ser. No. 16/201,179, filed Nov. 27, 2018 titled "EFFICIENT SHOWERHEAD WITH PURGE OUTLET," which application claims priority to U.S. provisional patent application 62/593,744, filed Dec. 1, 2017 titled "EFFICIENT SHOWERHEAD WITH PURGE OUTLET," the entirety of the disclosures of which are hereby incorporated by this reference.

TECHNICAL FIELD

Aspects of this document generally relate to energy efficient showerheads having temperature controlled purge outlets configured to quickly purge cold water in a supply line feeding the showerhead and then shut off the water when it reaches a predetermined temperature.

BACKGROUND

According to 2004 and 2011 papers by Jim Lutz at Lawrence Berkeley National Lab, shower warm-up waste is 20-30% of total shower time. Shower warm-up waste occurs when a user turns on the shower and goes to do something else while the water warms up at the shower head. Activities such as brushing teeth, shaving, using the washroom, picking out clothes, drinking coffee and other routine activities dictate the user's time away from the shower and wastes water.

SUMMARY

According to an aspect of the disclosure, a showerhead system comprises a normally open, temperature controlled first water valve coupled between a hot water source supply inlet and a purge outlet, the first water valve configured to move from its normally open position to a closed position to restrict water passing from the hot water source supply inlet to the purge outlet when a thermal actuator in the temperature controlled water valve reaches a predetermined temperature, wherein the showerhead system comprises at least two modes including: a first mode in which the temperature controlled first water valve selectively purges water from the hot water source supply inlet through the purge outlet until the thermal actuator reaches the predetermined temperature, and a second mode in which the first water valve blocks at least a majority of the water entering the first water valve from passing through the purge outlet and directs it toward the showerhead outlet.

Particular embodiments may comprise one or more of the following features. The showerhead system may further comprise a normally closed, manually operated second water valve coupled between the hot water source supply inlet and a showerhead outlet separate from the purge outlet, the second water valve comprising a manual actuator coupled configured to move the second water valve from its normally closed position to an open position and pass water from the hot water source supply inlet to the showerhead outlet, wherein the at least two modes of the showerhead system comprises three modes further including a third mode in which the normally closed, manually operated second water valve is open and passes water through the showerhead outlet. The second water valve may comprise a spring positioned adjacent a valve seat of the second water valve and configured to bias the second water valve into its normally closed position. A weep hole extending between the hot water supply source inlet and the showerhead outlet, bypassing the second water valve, the weep hole open when the first water valve is in its closed position and closed when the first water valve is in its open position. The first water valve may comprise a spring positioned adjacent a valve seat of the first water valve and configured to bias the first water valve into its normally open position when the thermal actuator is below the predetermined temperature.

According to an aspect of the disclosure, a showerhead system may comprise a temperature controlled first water valve coupled between a hot water source supply inlet and a purge outlet wherein the first water valve is configured to selectively purge water from the hot water source supply inlet through the purge outlet until the thermal actuator reaches the predetermined temperature and close when the thermal actuator reaches the predetermined temperature, directing water flow to a showerhead outlet separate from the purge outlet.

Particular embodiments may comprise one or more of the following features. A second water valve may be coupled between the hot water source supply inlet and a showerhead outlet separate from the purge outlet, wherein the second water valve is configured to selectively open and pass water from the hot water source supply inlet through the showerhead outlet. The second water valve may comprise a spring positioned adjacent a valve seat of the second water valve and configured to bias the second water valve into its normally closed position. A weep hole extending between the hot water supply source inlet and the showerhead outlet, bypassing the second water valve, the weep hole open when the first water valve is in its closed position and closed when the first water valve is in its open position. The first water valve may comprise a spring positioned adjacent a valve seat and configured to bias the first water valve into its normally open position when the thermal actuator is below the predetermined temperature.

According to an aspect of the disclosure, a showerhead water flow controller may comprise a main body comprising a water source supply inlet, a purge outlet and a showerhead outlet separate from the purge outlet, and a temperature controlled first water valve coupled between and controlling water flow between the water source supply inlet and the purge outlet, the first water valve comprising a thermal actuator within the first water valve configured to close the first water valve and stop a majority of water flow from the water source supply inlet to the purge outlet when the thermal actuator reaches a predetermined temperature, directing water flow to the showerhead outlet.

Particular embodiments may comprise one or more of the following features. A manually controlled second water valve may be coupled between and controlling water flow between the water source supply inlet and the showerhead outlet, the second water valve comprising a manual actuator accessible from outside the main body and configured to open the second water valve to pass water from the water source supply inlet to the showerhead outlet when the manual actuator is actuated. The second water valve may be biased to its normally closed position. A weep hole extending between the hot water supply source inlet and the showerhead outlet, bypassing the second water valve, the weep hole open when the first water valve is in its closed position and closed when the first water valve is in its open position. The first water valve may be biased to its normally open position when the thermal actuator is below the predetermined temperature.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material, or acts in support of the function. Thus, even when the claims recite a "means for performing the function of . . . " or "step for performing the function of . . . ," if the claims also recite any structure, material, or acts in support of that means or step, or to perform the recited function, it is the clear intention of the inventors not to invoke the provisions of 35 U.S.C. § 112, ¶6. Moreover, even if the provisions of 35 U.S.C. § 112, ¶6, are invoked to define the claimed aspects, it is intended that these aspects not be limited only to the specific structure, material, or acts that are described in the preferred embodiments, but in addition, include any and all structures, material, or acts that perform the claimed function as described in alternative embodiments or forms in the disclosure, or that are well-known present or later-developed, equivalent structures, material, or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE DRAWINGS

The present disclosure will now be described by way of example, with reference to the accompanying drawings.

Figure 1:
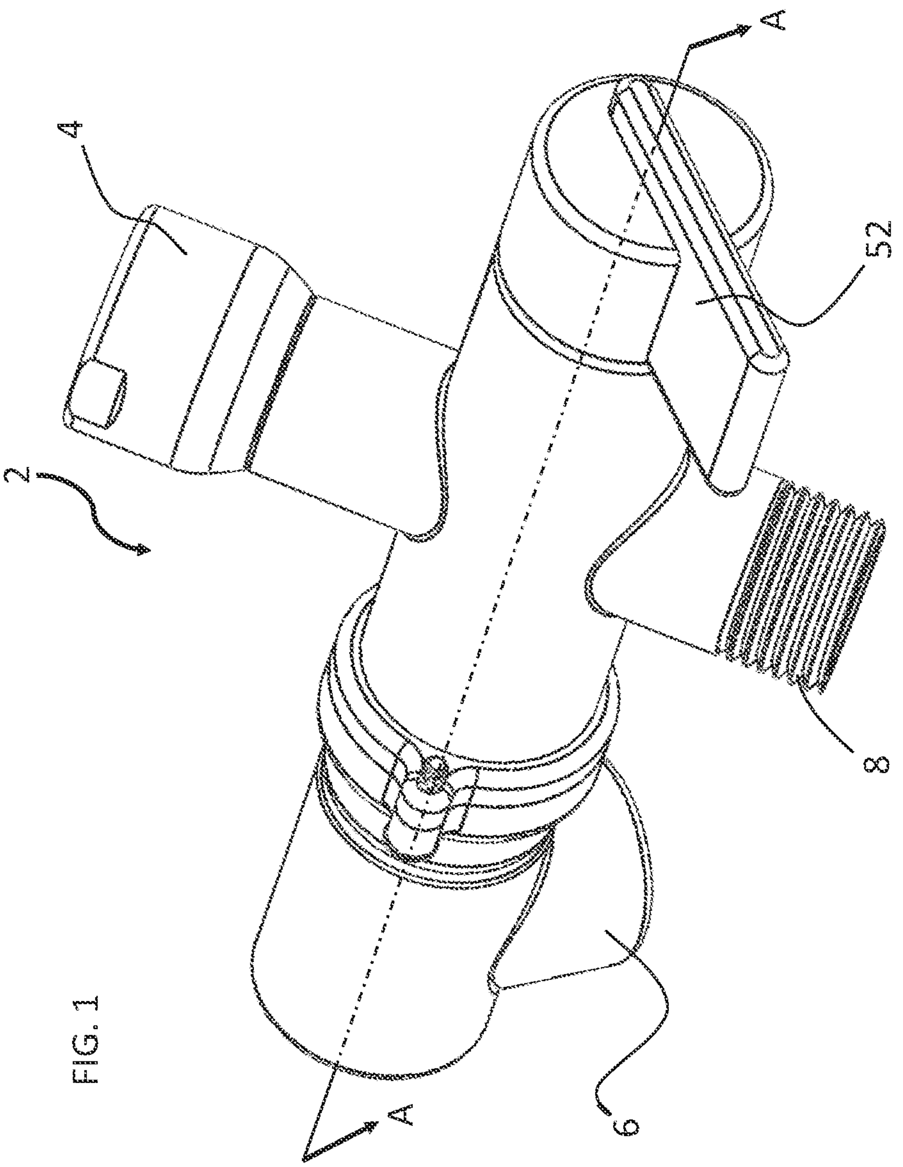
FIG. 1 is a perspective view of a showerhead water flow controller.

While the present disclosure will be described in connection with the preferred embodiments shown herein, it will be understood that it is not intended to limit the disclosure to those embodiments. On the contrary, it is intended to cover all alternatives, modifications, and equivalents, as may be included within the spirit and scope of the disclosure as defined by the appended claims.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

In an effort to conserve water and energy, the maximum flow rate for showerheads is continually regulated to decrease. This lowered flow rate increases the wait time a user is required to wait to receive hot water at the showerhead which can actually waste more energy than it saves. This is due, in part, to the thermal energy of hot water that flows in the supply line bleeding from the supply line before it is communicated to the showerhead. Hot water lines in a common household, such as copper piping, are not insulated, and thus the heat of the water heats the pipe and is transferred to the environment around the piping. For instance, rewriting regulations to reduce a 2.0 gallon per minute flow rate for a showerhead to 1.8 gallons per minute rate can actually waste more energy through the piping releasing energy for a longer time to its surrounding environment as the cold water is purged from the water supply line through the shower head. The slower the time the water takes to get from the hot water heater to the user, the more energy is released. Energy is also released due to the higher degree of mixing between the hot water and the cold water at lower flow rates. As velocity decreases two things happen. More heat is lost to the pipe carrying the water and more "luke warm" water, water that is too cold for showering, is created by mixing in the pipe as the water travels from the water heater to the mixing valve. Previous efforts have been made by Evolve Technologies, LLC of Scottsdale, Arizona to conserve water and energy through inventions such as those disclosed and described in U.S. Pat. Nos. 9,309,655 and 10,066,376, the disclosures of which are hereby incorporated herein by reference. However, as showerhead flow rates are being repeatedly regulated to slower flows, additional improvement is desired.

This disclosure provides a temperature controlled purge outlet in association with a showerhead, such that cold water in the supply line can be quickly purged to allow hot water to reach the showerhead quicker, such as at 4-6 gallons per minute. FIG. 1 illustrates a perspective view of a showerhead water flow controller 2 with a hot water source supply inlet 4, a purge outlet 6 and a showerhead outlet 8. Although the particular embodiments illustrated in FIGS. 1-5 illustrate the temperature controlled purge outlet embodied as a separate attachment to an existing showerhead, it is contemplated that in the embodiments illustrated or in other particular embodiments, and showerhead water flow controller 2 may be incorporated, fully or partially, within the showerhead itself. The temperature controlled purge outlet 6 is automatically moved to a closed position by an internal temperature controlled actuator once the water passing through the water flow controller 2 reaches a predetermined temperature, such as 95 degrees F. The closed position for the first valve 10 restricts the valve and stops water flow through the purge outlet 6, or allows it to flow at a greatly reduced rate less than 20% of its open position flow rate, and in some embodiments less than 10% of its open position flow rate, and in some particular embodiments, allows it to flow at a trickle. The hot water then flows through the showerhead water flow controller 2 at a greatly reduced rate until normal showerhead flow is activated by activating the manual actuator 52, such as by pressing a button, flipping a lever, turning a dial, pulling a cord or any other activating mechanism. The showerhead can also separately include a temperature controlled valve if desired, such as marketed by Evolve Technologies, LLC of Scottsdale AZ, referred to as the TSV valve.

Figure 2:
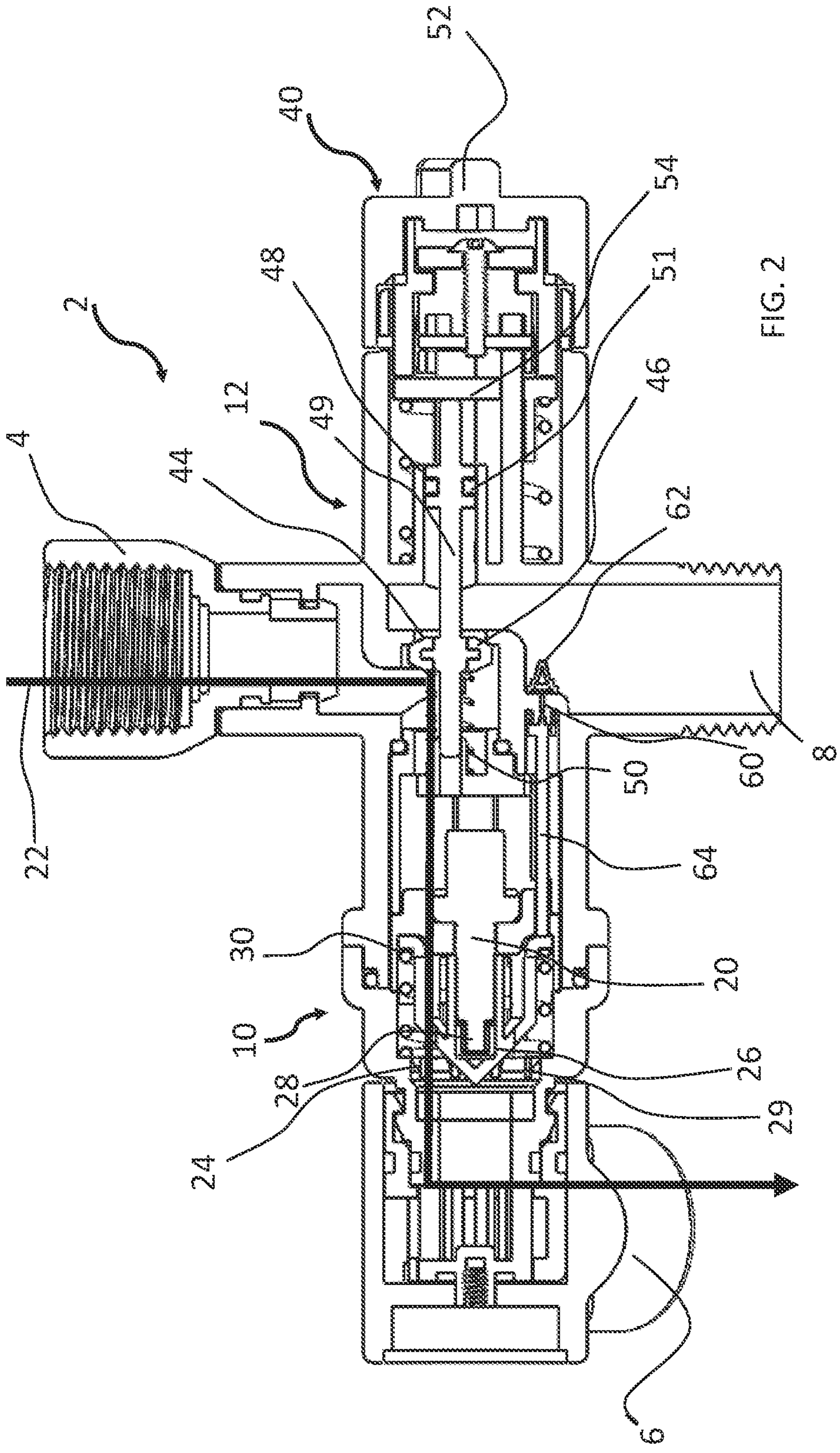
FIG. 2 is a cross-sectional view of the showerhead water flow controller of FIG. 1 taken along cross-section lines A-A with the controller in a first mode.

As shown in more detail in FIGS. 2-5, a temperature controlled, first water valve 10, which may be configured to be in a normally open position as illustrated in FIG. 2, comprises a channel 22 from the hot water source inlet 4 through the first water valve 10 and out the purge outlet 6. The first water valve 10 comprises a thermal actuator 20, such as that included disclosed and described in the Evolve Technologies, LLC patents incorporated previously herein by reference. The thermal actuator 20 is engaged within the channel 22, such as by being threadedly engaged with a receiver in the channel 22, and is activated by an increase in temperature from water passing through the channel 22. As the thermal actuator 20 is heated by the water, a piston 28 extends from the thermal actuator 20 and moves the first valve 10 into its closed position (FIGS. 3-5) with the valve seal 26 engaged with the valve seat 24. For the particular embodiment illustrated, a coil spring 30 is used to bias the first valve 10 into its normally open position (FIG. 2) when the thermal actuator 20 is below its predetermined temperature, though other biasing mechanisms may alternatively be used. Those of ordinary skill in the art will understand how to set the predetermined temperature to any desired temperature based on the selection of the particular form of thermal actuator 20 or materials from which the thermal actuator 20 is formed. The thermal actuator 20 may be configured as a thermal sensor that then actuates a separate valve, and the piston 28 from the thermal actuator itself is not required to be the actuating element for the valve.

Figure 3:
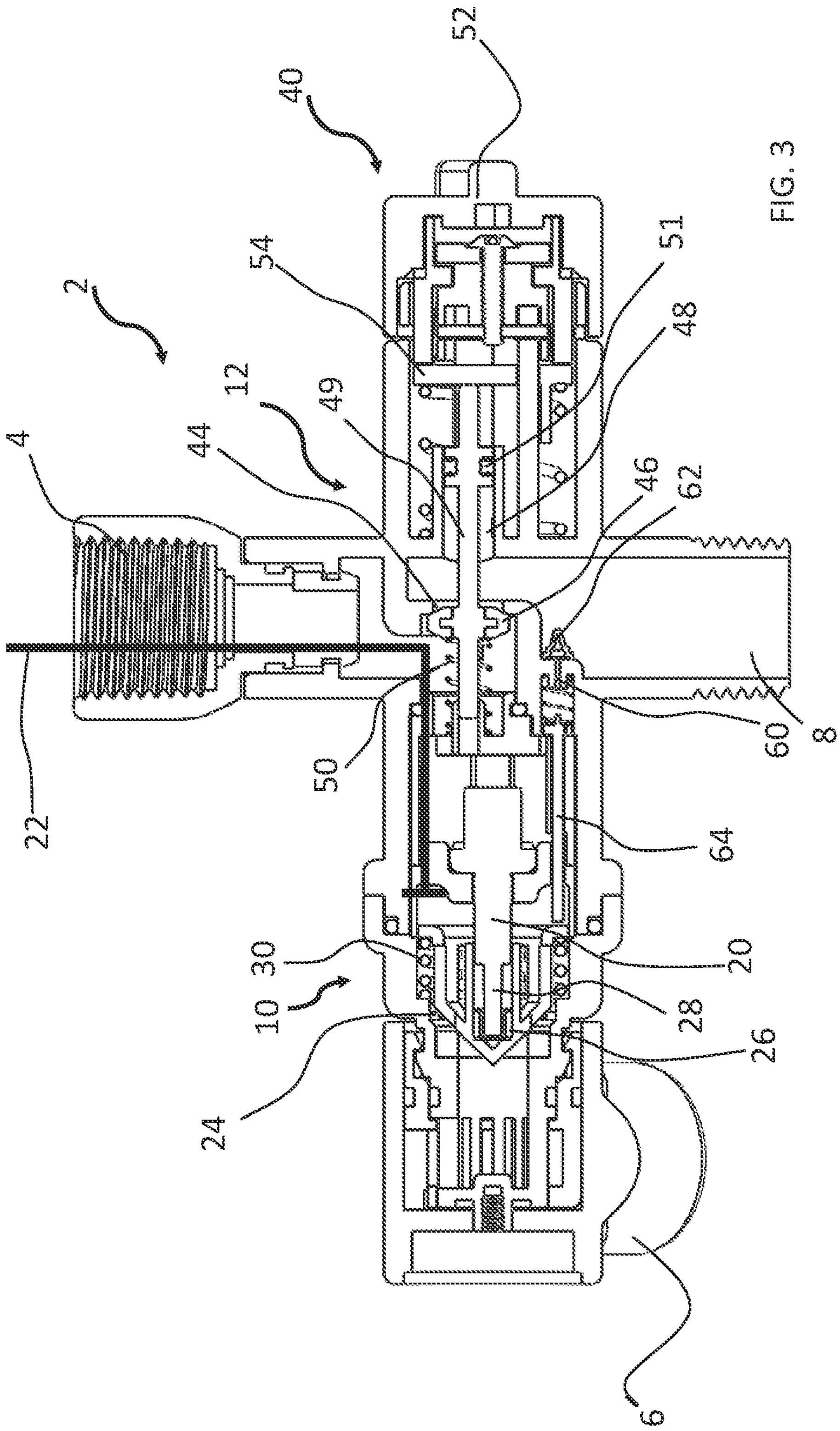
FIG. 3 is a cross-sectional view like that of FIG. 2, but with the controller in a second mode.
Figure 4:
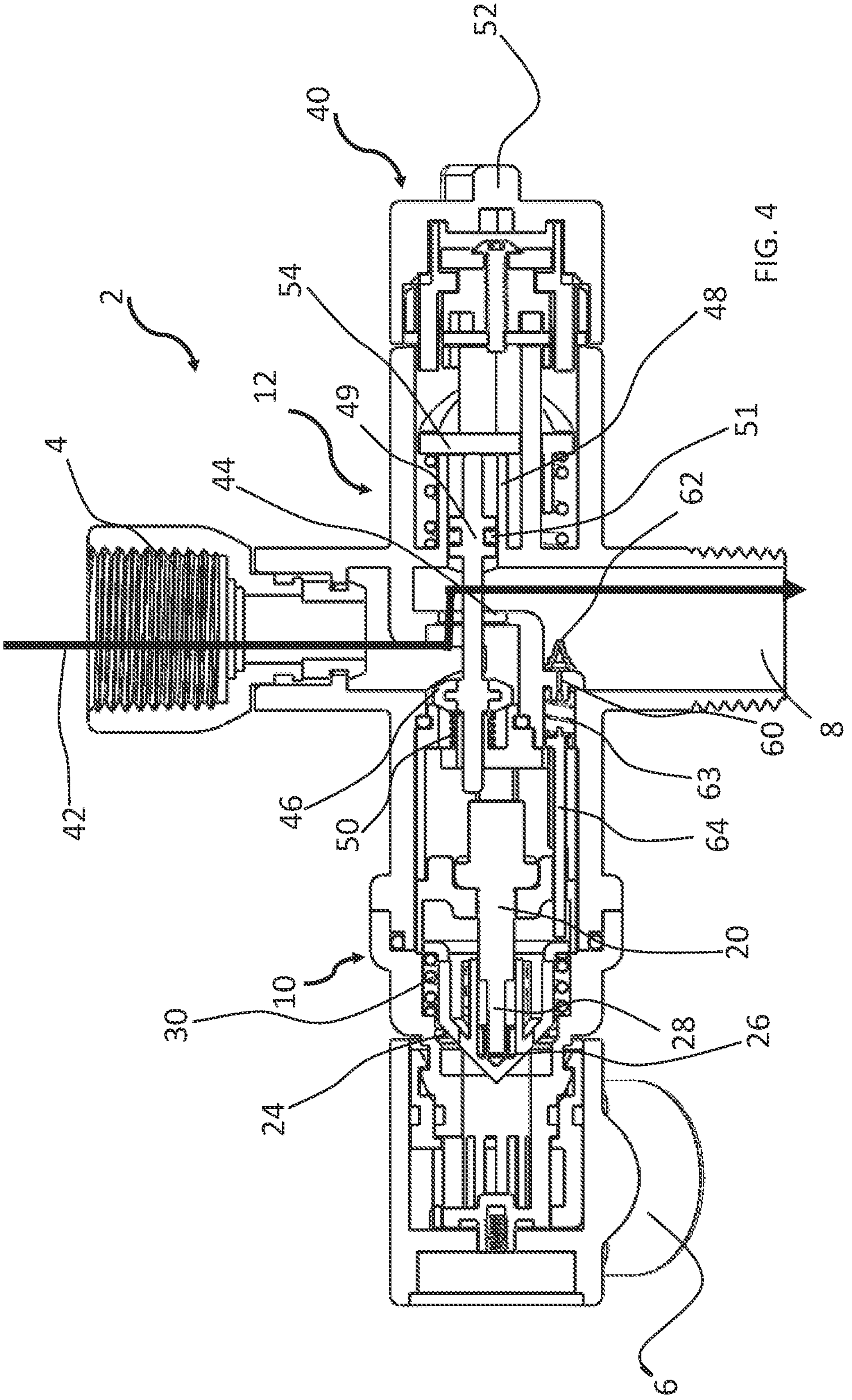
FIG. 4 is a cross-sectional view like that of FIG. 2, but with the controller in a third mode
Figure 5:
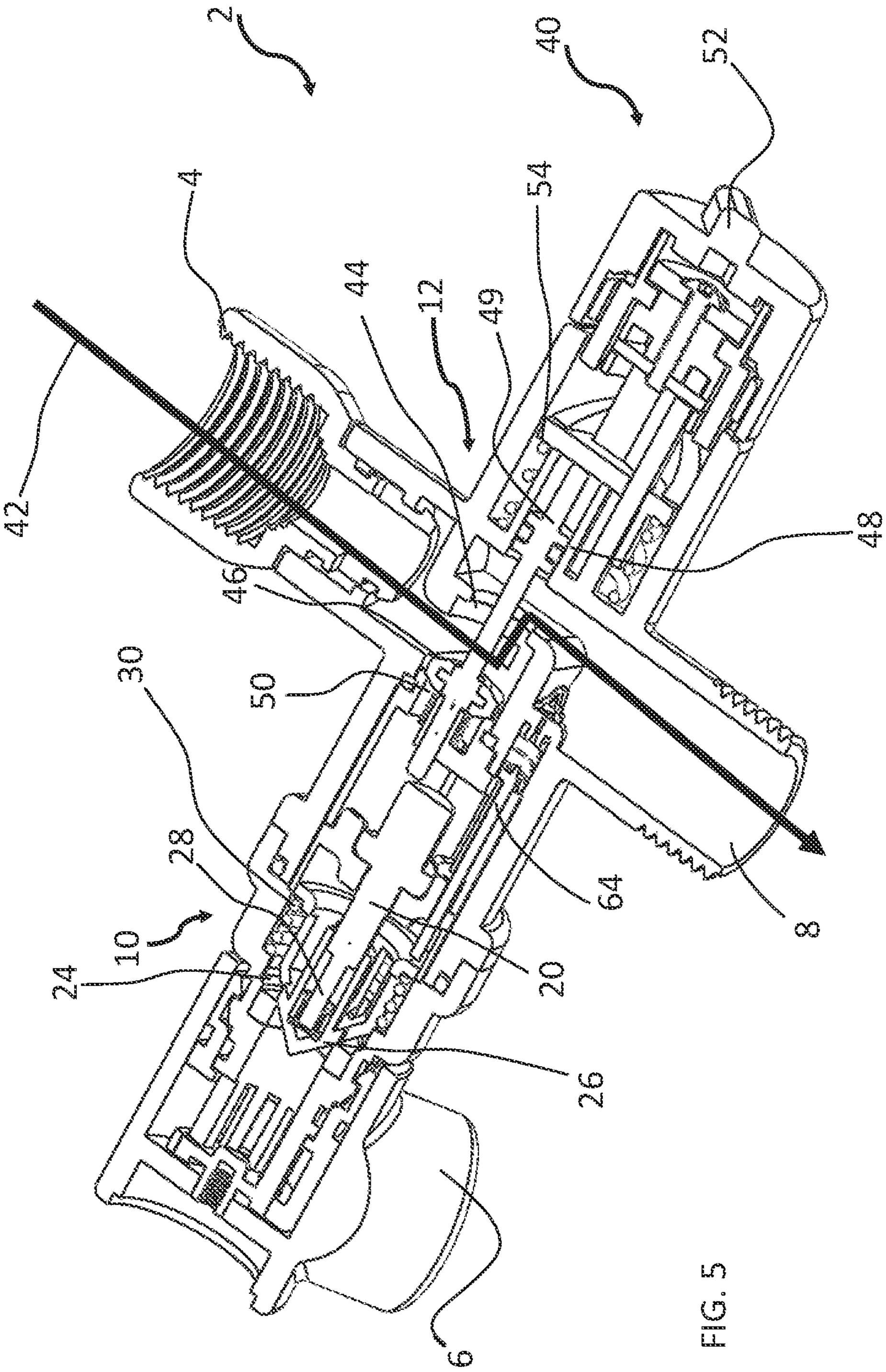
FIG. 5 is a perspective view of the cross-sectional view of FIG. 4.

When the first valve 10 moves from its open position (FIG. 2) to its closed position (FIGS. 3-5), water may be permitted to pass through the showerhead water flow controller 2 at a greatly reduced rate, as explained previously herein, from either the purge outlet 6, through a small opening 29 in the first valve 10 that allows some small amount of water to pass the first valve 10 even when the first valve 10 is in its closed position (FIGS. 3-5). Alternatively, or additionally, as illustrated in FIGS. 2-5, a weep hole 60 may be included to allow a trickle of water to pass to the showerhead outlet 8 when the first valve 10 is closed. A weep hole 60 may be provided between the hot water source supply inlet 4 and the showerhead outlet 8 that is permitted to open when the first valve 10 is closed. As illustrated in FIG. 2, when the first valve 10 is open, a weep hole actuator 64 is in a position that blocks the weep hole 60. When the first valve 10 is moved to its closed position as illustrated in FIG. 3, the weep hole actuator 64 moves away from the weep hole 60 to permit water pressure to access the weep hole 60 and allow a small amount of water to pass to the showerhead outlet 8. How much water flows through the weep hole 60 depends, in part, on the size of the weep hole and the weep hole plug 62 that sits on top of the weep hole 60. A weep hole spring 63 may be positioned to sit between the weep hole 60 and the weep hole actuator 64 to move the weep hole actuator 64 out of the way as the first valve 10 is closed.

Figure 6A:
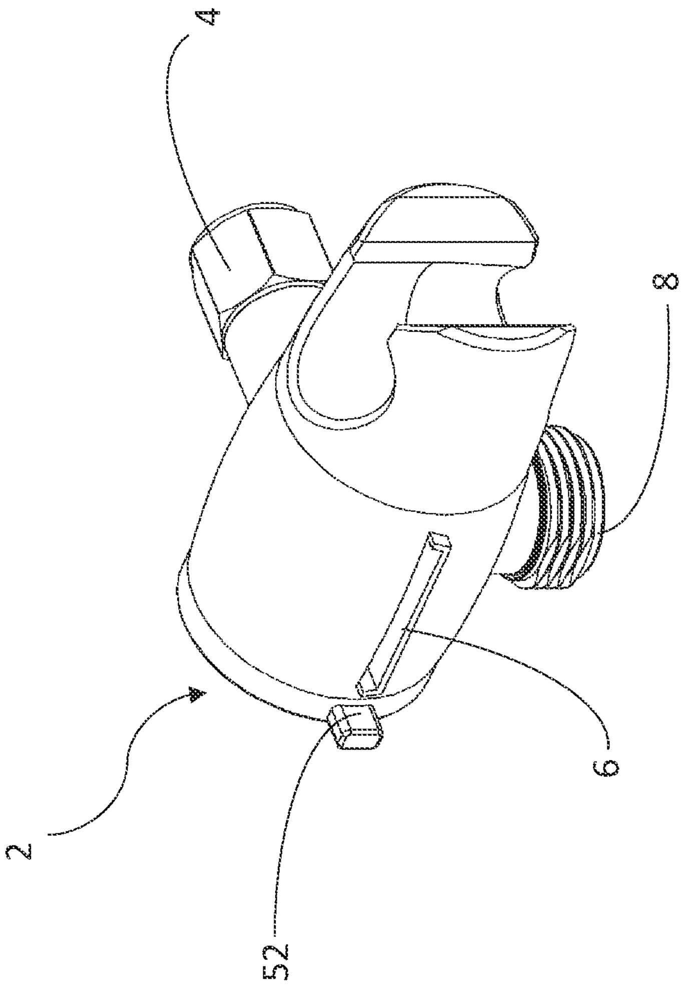
FIG. 6A is a perspective view of a showerhead water flow controller.
Figure 6B:
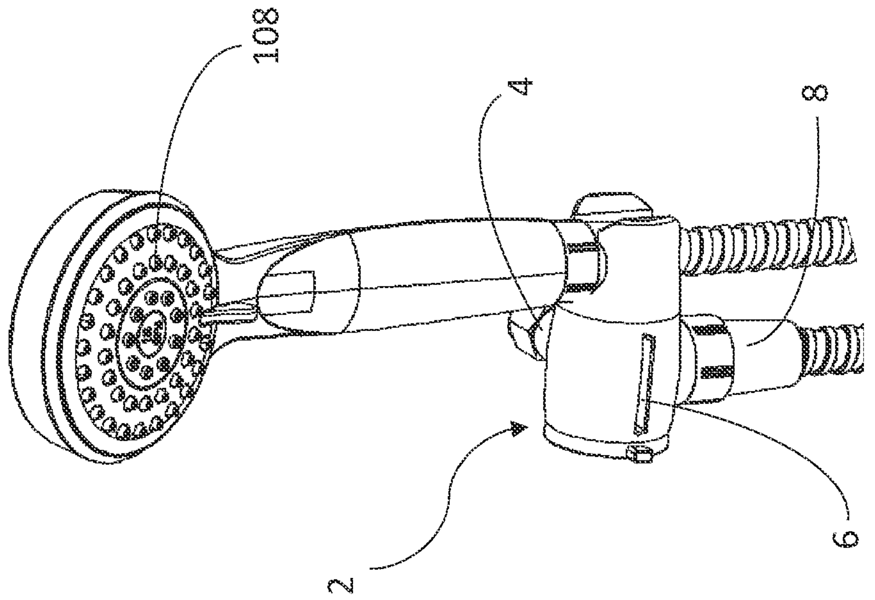
FIG. 6B is a perspective view of a first showerhead system with an elongated hose between the water flow controller and the showerhead.
Figure 6C:
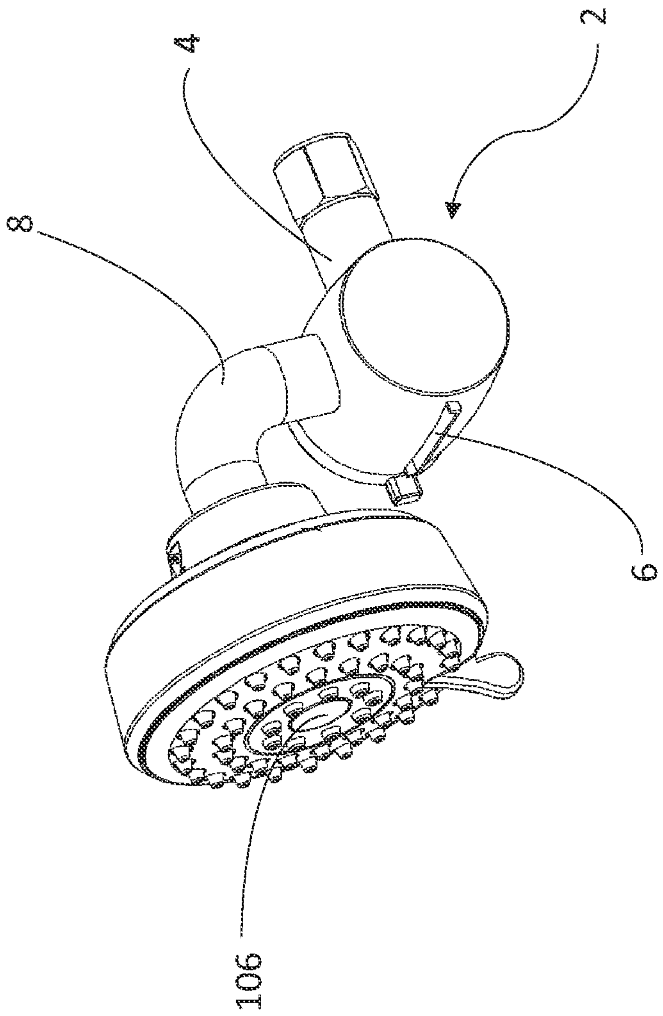
FIG. 6C is a perspective view of a second showerhead system with a short connector between the water flow controller and the showerhead.

Once the first, thermally actuated water valve 10 is moved to its closed position in response to the water becoming hot, the user can manually actuate a second water valve 12 in the showerhead water flow controller 2 to permit the now hot water to pass from the hot water source supply inlet 4 to the showerhead outlet 8 (FIG. 4) through a channel 42 through the controller 2. Although the showerhead flow controller 2 illustrates a purely mechanical valve structure, this structure is not critical to operation in particular embodiments. In particular embodiments, a digital valve may be used to digitally activate the water valves 10, 12, to respond to the water becoming hot and to the user activating the second water valve 12. Although many different forms of manual actuators are acceptable and those of ordinary skill in the art would understand how to replace the manual actuator 40 of this disclosure with other embodiments known in the art, in the embodiment of FIG. 4, the manual actuator 40 includes a actuator grip 52 that actuates a press bar 54 to move the manual actuator 40 from its normally closed position (FIGS. 2-3) to its open position (FIGS. 4-5). In the closed position (FIGS. 2-3), the manual actuator seal 46 is engaged with the manual actuator seat 44 to close the second valve 12. As with the first valve 10, the closed position of the second valve 12 may permit passage of a substantially reduced water flow, less than 20% of its open position flow and in particular embodiments less than 10% of its open position flow, and in some particular embodiments completely closed so that there is no water flow or merely a trickle of water flow. The second valve 12 may be biased into its normally closed position with a biasing mechanism, such as with a coil spring 50. When the manual actuator 40 is activated to move the second valve 12 to its open position, the force of the spring 50 is small enough that water pressure from the hot water source supply inlet 4 maintains the second valve 12 in its open position until the water pressure is relieved at which time the force of the spring 50 is sufficient to force the second valve 12 and its manual actuator 40 back to the normally restricted positions (FIGS. 2-3). A secondary seal 51 may be included around the second valve shaft 49 to restrict water from leaking through the manual actuator 40. In certain particular embodiments, the second valve 12 is optional and may not be included. In such embodiments, water would flow through the purge outlet 6 and the showerhead outlet port 8 until the temperature rises to the predetermined temperature to purge any cold water from the system. When the temperature reaches the predetermined temperature, the piston 28 from the thermal actuator 20 causes the first valve 10 to move to its closed position and the water flow through the water flow controller 2 would exit through the showerhead outlet port 8 to the showerhead 106, 108 (FIGS. 6B-6C). In situations where the colder water from the system can be purged quickly, a second valve 12 and additional manual actuator stage is not necessary.

In certain exemplary embodiments, the water flow controller 2 may be formed as part of a shower wand holder (FIGS. 6A and 6B) with a showerhead wand 108 attached to the showerhead outlet port 8 with an extended hose 110 (FIG. 6B) or with a showerhead 106 attached to the showerhead outlet port 8 with a shorter showerhead connector 112 (FIG. 6C). In other embodiments contemplated, the purge outlet 6 may be included as an enlarged opening the showerhead face itself sufficient to permit 4-6 gal/min. of water flow at a typical house water pressure of 100 psi.

The foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

The invention claimed is:

1. A hot water system, comprising:

a water valve biased toward an open position and coupled between a hot water supply inlet and a purge outlet, the water valve configured to move between the open position and a closed position;

wherein, when the hot water system operates in a first mode, the water valve is in the open position, the hot water system selectively purges water from the hot water supply inlet through the purge outlet instead of through a hot water outlet, and water passes through the hot water system at a first volumetric flow rate;

wherein, when the hot water system operates in a second mode different from the first mode, the water valve is in the closed position, the water valve blocks at least a majority of the water entering the water valve from passing through the purge outlet and instead directs the water toward the hot water outlet, and water passes through the hot water system at a second volumetric flow rate less than the first volumetric flow rate and greater than zero.

2. The hot water system of claim 1, wherein the hot water outlet is separate from the purge outlet.

3. The hot water system of claim 1, wherein the water valve is configured to move from the open position to the closed position when a temperature within the water valve rises above a predetermined temperature.

4. The hot water system of claim 1, wherein the water valve is configured to automatically move from the open position to the closed position in response to movement of an actuator within the water valve.

5. The hot water system of claim 1, the water valve comprising a spring positioned within the water valve and configured to bias the water valve toward the open position.

6. A hot water system, comprising:

a water valve biased toward an open position and coupled between a hot water supply inlet and a purge outlet, the water valve configured to move between the open position and a closed position;

wherein, when the hot water system operates in a first mode, the water valve is in the open position, the hot water system purges water from the hot water supply inlet through the purge outlet and through a hot water outlet, and water passes through the hot water system at a first volumetric flow rate;

wherein, when the hot water system operates in a second mode different from the first mode, the water valve is in the closed position, the water valve blocks at least a majority of the water entering the water valve from passing through the purge outlet, and water passes through the hot water system at a second volumetric flow rate less than the first volumetric flow rate and greater than zero; and wherein the water valve is configured to automatically switch from the first mode to the second mode when a temperature within the water valve rises above a predetermined temperature.

7. The hot water system of claim 6, wherein the hot water outlet is separate from the purge outlet.

8. The hot water system of claim 6, wherein the temperature within the water valve is a temperature of a thermal actuator in the water valve.

9. The hot water system of claim 6, the water valve comprising a spring positioned within the water valve and configured to bias the water valve toward the open position.

10. The hot water system of claim 6, wherein, when the hot water system operates in the second mode, the water valve is configured to direct the water toward the hot water outlet.

11. A hot water system, comprising:

a water valve coupled between a hot water supply inlet, a hot water outlet, and a purge outlet;

wherein when the hot water system operates in a first mode, water passes through the hot water system to the purge outlet at a first volumetric flow rate;

wherein when the hot water system operates in a second mode different from the first mode, water passes through the hot water system to the purge outlet at a second volumetric flow rate less than the first volumetric flow rate and greater than zero; and wherein the water valve is configured to automatically switch from the first mode to the second mode and stop at least a majority of water flow through the hot water system when a temperature within the water valve rises above a predetermined temperature.

12. The hot water system of claim 11, wherein the water valve is configured to move between an open position when the hot water system operates in the first mode and a closed position when the hot water system operates in the second mode.

13. The hot water system of claim 12, wherein the water valve is biased toward the open position.

14. The hot water system of claim 13, the water valve comprising a spring positioned within the water valve, the spring configured to bias the water valve toward the open position.

15. The hot water system of claim 11, wherein the temperature within the water valve is a temperature of a thermal actuator in the water valve.

16. The hot water system of claim 11, wherein, when the hot water system operates in the second mode, the water valve is configured to direct the water toward the hot water outlet.

17. The hot water system of claim 11, wherein, when the hot water system operates in the first mode, the hot water system selectively purges water from the hot water supply inlet through the purge outlet instead of through the hot water outlet.

18. The hot water system of claim 17, wherein the hot water outlet is separate from the purge outlet.

19. The hot water system of claim 11, wherein, when the hot water system operates in the first mode, the hot water system purges water from the hot water supply inlet through the purge outlet and through the hot water outlet.

20. The hot water system of claim 19, wherein the hot water outlet is separate from the purge outlet.

* * * * *